United States Patent [19]
Espelage

[11] 3,959,719
[45] May 25, 1976

[54] STATIC CONTROLLER FOR POWER FACTOR CORRECTION AND ADAPTIVE FILTERING

[75] Inventor: Paul M. Espelage, Ballston Lake, N.Y.

[73] Assignee: General Electric Corporation, Schenectady, N.Y.

[22] Filed: Apr. 30, 1975

[21] Appl. No.: 573,372

[52] U.S. Cl.................................. 323/102; 321/7; 323/119
[51] Int. Cl.².......................................... G05F 5/00
[58] Field of Search ................ 318/179, 227; 321/5, 321/10, 7, 11–14, 60, 65, 69 R; 323/102–106, 107, 117, 119

[56] References Cited
UNITED STATES PATENTS

| | | | |
|---|---|---|---|
| 3,419,785 | 12/1968 | Lafuze | 321/5 X |
| 3,444,450 | 5/1969 | Koppelmann | 321/5 X |
| 3,449,653 | 6/1969 | Koppelmann | 321/5 X |
| 3,551,799 | 12/1970 | Koppelmann | 323/8 |
| 3,742,336 | 6/1973 | Bedford | 321/69 R |
| 3,745,437 | 7/1973 | Brown | 323/8 X |
| 3,768,001 | 10/1973 | Thorborg | 323/102 |
| 3,829,759 | 8/1974 | Thorborg | 323/102 X |
| 3,882,369 | 5/1975 | McMurray | 321/7 X |

*Primary Examiner*—William M. Shoop
*Attorney, Agent, or Firm*—Donald R. Campbell; Joseph T. Cohen; Jerome C. Squillaro

[57] ABSTRACT

A polyphase cycloconverter operating in regenerative mode is connected between a voltage distribution system and a single phase high frequency resonant tank and controlled to produce essentially no real power flow to the resonant tank and a variable amount of leading (or lagging) reactive power. The static reactive power controller has fast response and can function as an electronically variable capacitor for power factor regulation, VAR control and adaptive filtering.

11 Claims, 11 Drawing Figures

PHASOR DIAGRAM FOR REAL POWER CONTROL

PHASOR DIAGRAM FOR POWER FACTOR CONTROL (LEADING P.F.)

(LAGGING P.F.)

STATIC CONTROLLER FOR POWER FACTOR CORRECTION AND ADAPTIVE FILTERING

BACKGROUND OF THE INVENTION

This invention relates to a static controller for power factor correction or adaptive filtering, and more particularly to a cascaded polyphase cycloconverter and single phase high frequency resonant tank circuit controlled so as to provide distribution system power factor correction, either leading or lagging, or alternately to function as a fast response adaptive capacitive filter or inductive filter.

System power factor corrrection in electrical power distribution systems if often required for various lagging loads, and is normally accomplished by polyphase capacitor banks operating at distribution frequency. Also, occasionally a fast system response is required to eliminate damaging resonances in faulted distribution systems or to sufficiently attenuate variable amplitude and/or frequency line harmonics caused by switching type loads. Variable leading reactive power can be obtained by switched capacitor banks, using phase controlled thyristors connected in series with inductors to vary the equivalent reactance. The present invention is directed to an alternate and more versatile solid state circuit that is lightweight with a fast response and provides either power factor correction or adaptive filtering. Both applications are quite common, such as for use with large KVA phase control systems.

The cascaded high frequency link cycloconverter system is disclosed in U.S. Pat. No. 3,742,336 to B. D. Bedford and in allowed application Ser. No. 419,490 now U.S. Pat. No. 3,882,369 to W. McMurray, both assigned to the assignee of this invention, and usually is comprised by input and output cycloconverters separated by a high frequency resonant tank which provides commutation for both cycloconverters. As typically used with an inductive load, the tank frequency is variable to control the amount of reactive power, since the capacitor reactive power increases and the inductor reactive power decreases as the frequency is raised above the resonant frequency. When used without the output cycloconverter as here taught, the high frequency link converter distinguishes in one manner in that only the reactive power needed for power factor correction of filtering is required and not the full load power.

SUMMARY OF THE INVENTION

In accordance with the invention, a static reactive power controller based on the high frequency link cycloconverter approach utilizes essentially only a polyphase cycloconverter in cascade with a single phase high frequency resonant tank circuit usually comprised by a single inductor and capacitor in parallel, the cycloconverter further having an input filter including in each phase a series filter inductor which is connected to a source of low frequency line or distribution voltage. Control means are provided for controlling the cycloconverter to produce real power flow to the resonant tank only approximately sufficient to supply the losses, while producing a variable amount of leading or lagging reactive power as determined by the polarity and magnitude of a control signal representative of a system quantity to be controlled. Depending on the application, the control signal is a distribution system power factor correction signal, a VAR control signal, etc. Preferably the real power is controlled by a tank voltage error signal which functions to maintain an approximately constant tank voltage. Thus, the phase and amplitude shifter in the control circuit generates cycloconverter reference signals for effectively controlling the real and reactive power of the cycloconverter as determined respectively by the tank voltage error signal and the externally generated control signal.

Since leading as well as lagging reactive power can be controlled in vernier fashion with a fast response, the static controller can provide an electronically variable capacitance in the previously mentioned applications for power factor correction, adaptive filtering, and VAR control. Thus, the usual polyphase capacitor acting at distribution frequency is replaced by a single phase high frequency capacitor thereby reducing filter size and improving system response.

DESCRIPTION OF THE PREFERRED EMBODIMENT

Figure 1:
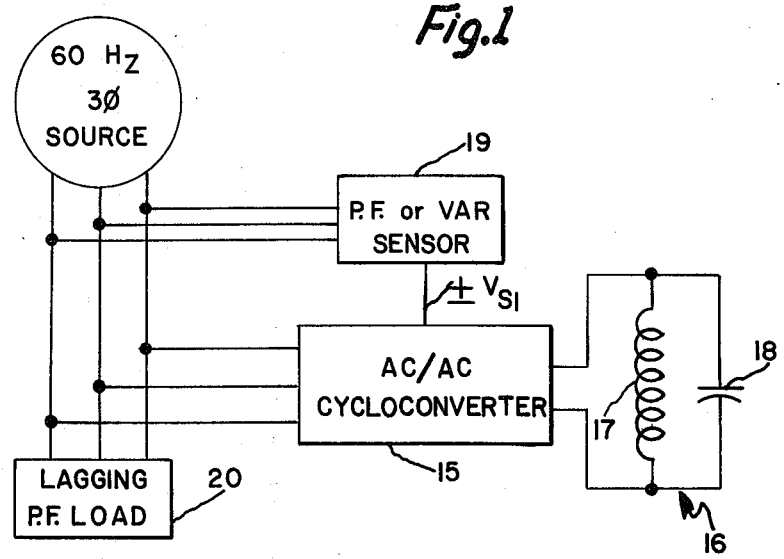
FIG. 1 is a simplified block diagram of the cycloconverter system for variable power factor correction or filtering with a smaller high frequency capacitor.

The high frequency link static reactive power controller as shown in FIG. 1 is most commonly connected to a polyphase voltage distribution system and can be controlled to produce either leading or lagging reactive power in typical applications such as power factor correction, VAR control, and adaptive filtering. The static controller is comprised by a polyphase ac/ac cycloconverter 15 connected in cascade with a high frequency resonant tank circuit 16 or parallel resonant L-C commutation circuit preferably including only a single inductor 17 and capacitor 18 in parallel. The amount and sign of the reactive power produced by the static controller is determined by an externally generated control signal $v_{s1}$ of either polarity that is representative of a system quantity to be controlled. The control signal $v_{s1}$ for example is a system power factor correction signal or a VAR control signal generated by a device which includes a power factor or VAR sensor 19 for sensing the appropriate distribution system parameters and deriving a signal proportional to the difference from a desired value. The preferred embodiment is explained with regard to power factor correction of a system with a lagging power factor load 20 energized by a three-phase, 60 Hz or other low frequency voltage source. Of course, usually a unity system power factor is desired although the static controller herein described has a fast response and regulates power factor as desired. As compared to the prior art polyphase capacitor operating at distribution frequency, power factor correction in a polyphase system is achieved with a single phase, electronically variable, high frequency capacitor, thereby reducing filter size and improving system response.

The static reactive power controller can be constructed in either delta-connected or wye-connected versions similar to the high frequency link cycloconverter systems, assuming that the output cycloconverter and output filter are not used, illustrated in FIGS. 14 and 15 of the previously mentioned U.S. Pat. No. 3,882,369, to which the reader may refer for further information. The preferred wye-connected cycloconverter system here shown in FIG. 2 uses a twelve-thyristor cycloconverter 15 comprised by three single phase-to-single phase cycloconverters. In each single phase cycloconverter, one pair of inverse-parallel thyristors 21 is connected to one junction of the tuned high frequency resonant tank 16 while the other pair of thyristors is connected to the other junction, and both pairs are connected through a series reactor or filter inductor 22 to one of the input terminals 23. The input filter also includes three filter capacitors 24 provided between the respective input terminals 23 and the neutral terminal N, the neutral terminal also being connected to the center tap of tank inductor 17. As most commonly used, the source is a three-phase, 60 Hz, 230 volts supply, and the high frequency tank is operated at about 2–4 kHz. Cycloconverter 15 operates in the regenerative or inverting mode and drives the tuned high frequency tank 16 directly from the polyphase ac supply at a frequency above its resonant frequency, the amount of commutating energy for the thyristors being determined by the tank frequency. The cycloconverter control circuit or control means permits either direction of power flow through the cycloconverter, however, and in the event of power flow from the tank to the source the cycloconverter is controlled in conventional fashion to operate in rectifying mode.

Figure 2:
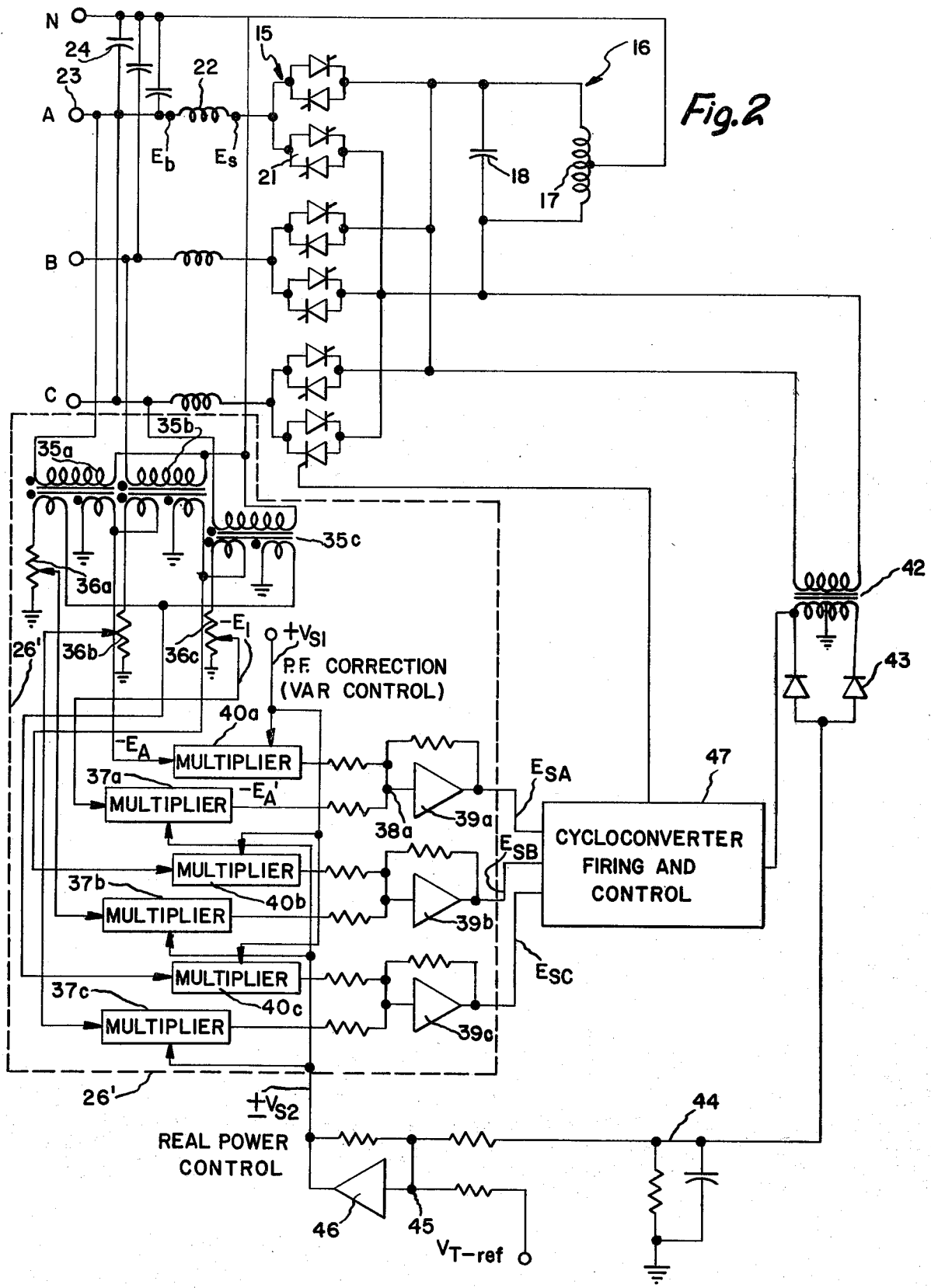
FIG. 2 is a schematic circuit diagram partially in block diagram form of the cycloconverter system and one embodiment of a suitable control circuit.
Figure 4:
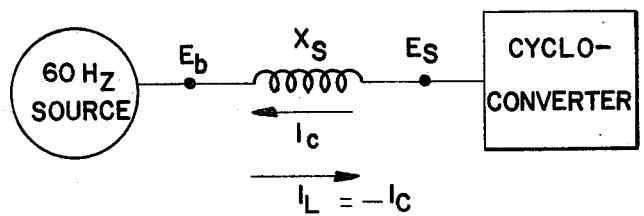
FIG. 4 shows diagrammatically a cycloconverter analogy to a synchronous machine.

In accordance with the invention, the control circuit shown at the bottom of FIG. 2 controls the cycloconverter to produce real power flow to the resonant tank only approximately sufficient to supply the static controller losses, i.e., there is essentially no real power flow to the resonant tank. Also, as was previously mentioned, the cycloconverter is controlled to selectively produce a variable amount of leading and lagging reactive power as determined by the polarity and magnitude of the control signal $v_{s1}$. A tank voltage error signal is used as the real power control signal $v_{s2}$ and maintains the high frequency tank voltage constant or within predetermined limits, in view of the fact that the resonant tank 16 is a relatively small reservoir of energy as compared to the system as a whole. Too high a tank voltage can damage the components, while too low a tank voltage can result in excessive input currents for much the same reason as when the back emf of a synchronous machine is low. In the synchronous machine analogy, to be explained in detail later, and using phase A by way of illustration, the phasor summation of the per phase sine wave line voltage $E_b$ at the input terminal 23 and the voltage produced across the filter inductor 22 is the induced voltage $E_s$ of the cycloconverter. In the voltage control system to be described, the cycloconverter control circuit establishes the phase and amplitude of the induced voltage $E_s$ so that the static controller produces the commanded amount of reactive power while maintaining the high frequency tank voltage within prescribed limits for either direction of power flow. With respect to the distribution system line voltage used as a reference, the sign and amplitude of the reactive power (or the input power factor) are respectively determined by the sign and amplitude of the direct component of voltage, while the direction and amount of real power flow are respectively determined by the sign and amplitude of the quadrature component of voltage. The control circuit to be described actually controls the input power factor, however the predominant effect since the real power flow is small is to control the magnitude of the reactive power. The basis of operation of the static controller using the voltage control system is that the cycloconverter is controlled to produce essentially no real power flow to the resonant tank while generating an induced voltage $E_s$ approximately in phase with the distribution system line voltage, with the result that the line current is approximately 90° displaced from a distribution system line voltage. As is evident in FIG. 3 to those skilled in the art, the per phase cycloconverter reference signals $E_{s-ref}$ to satisfy this control scheme and mode of operation are employed in conventional fashion in the cycloconverter firing and control circuit, using the cosine firing wave phase control technique, to generate appropriately timed firing pulses for the thyristor switches.

Before proceeding further, the synchronous machine analogy and the theoretical basis for the construction and operation of the phase and amplitude shifter, an essential component of the cycloconverter control means, will be explained with regard to FIGS. 4–9. In the diagram shown in FIG. 4 of a cycloconverter analogy to a synchronous machine operating on infinite bus or from a "stiff" source, 60 Hz power is supplied through reactor $X_s$ (i.e., filter inductor 22) to the cycloconverter. For simplicity the impedance $X_s$ is assumed to be purely reactive, and $E_b$ and $E_s$ are as previously identified in FIG. 2. Following the synchronous machine analogy, $I_c$ is the current flowing in a direction from the cycloconverter to the source, and $I_L = -I_c$ is the current flowing from the source to the cycloconverter.

Figure 5:
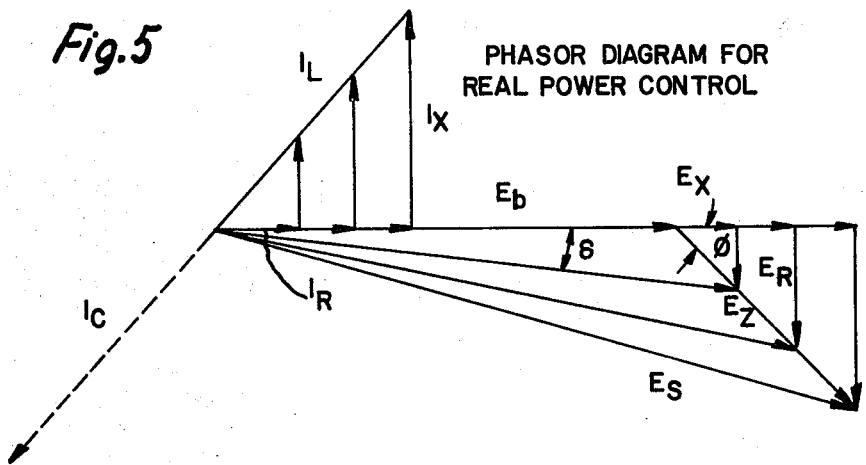
FIGS. 5–8 are phasor diagrams illustrating the theoretical basis for real power control and input power factor control.

Referring now to FIG. 5 which gives the phasor diagram for real power control, the induced voltage phasor $\bar{E}_s$ can be constructed as $$\bar{E}_s = \bar{E}_b + \bar{E}_z = \bar{E}_b + \bar{E}_x + \bar{E}_R,$$

where $$\bar{E}_z = \bar{I}X_s, \bar{E}_x = \bar{I}_x X_s, \text{ and } \bar{E}_R = \bar{I}_R X_s.$$

Figure 6:
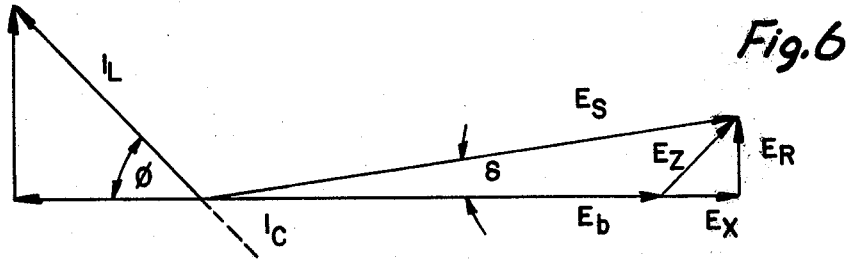

Therefore, when the $\bar{E}_z$ phasor is constructed at a fixed angle $\phi$ and its amplitude is modulated as illustrated in FIG. 5, the real power will be modulated maintaining the input power factor constant. It will be noted that FIG. 5 is drawn with respect to the line current $I_L$, in which case the angle $\delta$ between $\bar{E}_b$ and $\bar{E}_s$ is less than zero and power flow is from the source to the cycloconverter. As shown in FIG. 6, when $E_z$ is constructed in the first quadrant by reversing $E_R$, the cycloconverter will revert from the inverting or regenerative mode to the rectifying or active mode, and real power flows in the other direction from the cycloconverter to the source. It is noted in FIG. 6 that the angle δ is greater than zero and that the powr flow reverses as compared to FIG. 5 since $I_L$ is constructed in the second rather than in the first quadrant.

Figure 7:
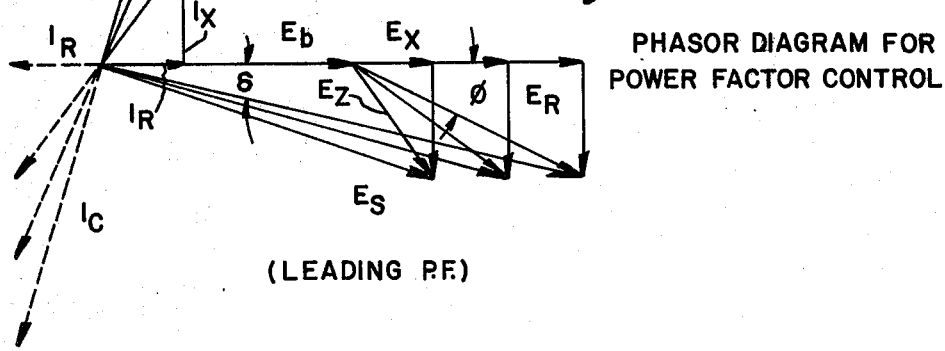
Figure 8:
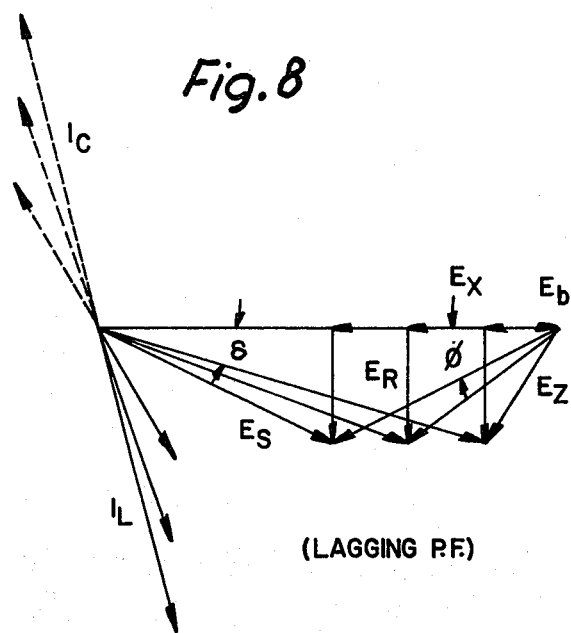

FIG. 7 shows the phasor diagram for leading input power factor control for source to cycloconverter power flow. To modulate the input power factor, conventionally defined as cos φ, the phasor $\overline{E}_x$ is modulated to control the input power factor while maintaining the real power constant. FIG. 8 applies to lagging power factor control for source to cycloconverter power flow. The phasor $\overline{E}_x$ changes sign as compared to FIG. 7 and is modulated, and therefore the power factor changes from the leading to the lagging region. In this regard it is observed that the line current $I_L$ changes from the first to the fourth quadrant. In all of these diagrams the angle ε between $E_b$ and $E_s$ is assumed to be small.

Figure 9:
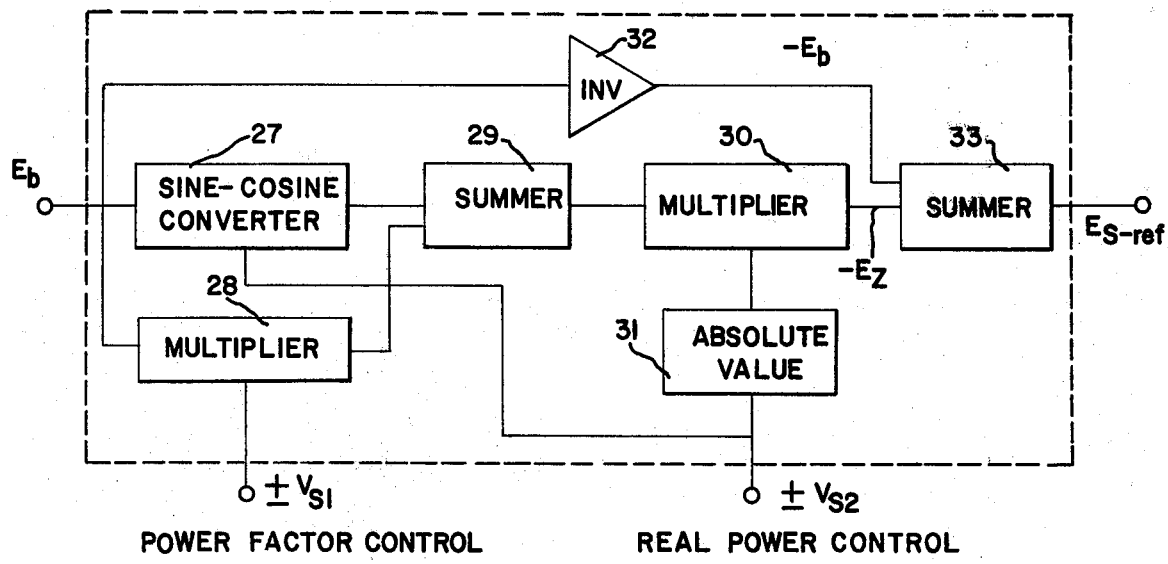
FIG. 9 is a block diagram of a phase and amplitude shifter for generating cycloconverter reference signals for independently controlling real power and input power factor using either polarity of d-c control signals.

FIG. 9 shows a simple phase and amplitude shifter 26 for generating single phase cycloconverter reference voltage signals which can control the real power and input power factor of the cycloconverter independently and linearly by dc signal voltages. The phase shifter circuit is insensitive to bus or line voltage frequency drift, is distortion free, and has an almost instantaneous response characteristic. In addition, the real power and power factor angle can be changed to either polarity by simply reversing the polarity of the dc control signals. Of course, for a three phase shifter three of the single phase circuits shown in FIG. 9 are required. Ordinarily, the signal levels are reduced by the gain factor of the cycloconverter, and thus the per phase input sine wave line voltage signal $E_b$ is preferably obtained in the case of the FIG. 2 system by means of a step-down potential transformer directly coupled between one input terminal 23 and the neutral terminal N. The input line voltage signal (see FIG. 9) is converted to a cosine wave of proportional amplitude using a frequency insensitive sine-cosine converter 27, such as the device described in the copending application Ser. No. 561,592 by B. K. Bose and the inventor, entitled "Frequency Insensitive Sine Wave-to-Cosine Wave Converter," filed on Mar. 24, 1975, and assigned to the same assignee as this invention. This converter employs the trigonometric relationship $\cos \omega t = \sqrt{1-\sin^2 \omega t}$ and is operative over a wide frequency range with an almost instantaneous response characteristic to produce cosine waves with an amplitude proportional to the sine wave amplitude. In one form implemented with presently available integrated circuits, the converter includes an analog multiplier for generating a sine wave squared signal, a clamping circuit for effectively shifting the voltage level, a sign inverter for generating a cosine wave squared signal, a square rooter for producing a negative-going full wave rectified cosine wave, a second sign inverter, and a polarizer for converting the positive-going full wave rectified cosine wave to the desired ac cosine wave. Another suitable prior art technique for frequency insensitive cosine wave generation involves integrating the sine wave and then multiplying the amplitude of the cosine wave by a voltage proportional to the frequency. The dc real power control signal $v_{s2}$ is used as a polarity reversing signal for sine-cosine converter 27, and thus when $v_{s2}$ is negative a negative cosine wave is generated. In a parallel branch, $E_b$ is fed to an analog four-quadrant multiplier 28 used as a variable gain amplifier, the second input to the multiplier being the dc power factor control signal $v_{s1}$ which can be of either polarity depending upon whether a leading or lagging power factor is desired. The resulting variable amplitude sine wave has a peak amplitude and polarity depending upon the magnitude and polarity of $v_{s1}$, and is combined with the frequency insensitive cosine wave in summer 29 to generate at its output a summation signal. In terms of the phasor diagram for power factor control in FIG. 7, the in-phase sine wave signal (indicative of $\overline{E}_x$) is multiplied or modulated according to the desired power factor, while the cosine wave signal (indicative of $\overline{E}_R$) remains constant, the two being summed preferably using an operational amplifier to obtain the summation signal (indicative of $\overline{E}_z$).

To implement the real power control, the output of summer 29 is fed to an analog two-quadrant multiplier 30, the second input to this multiplier being the absolute value of the real power control signal $v_{s2}$. A circuit 31 is used to invert the negative polarity dc signal since $v_{s2}$ is of either polarity depending upon the commanded direction of power flow through the cycloconverter. In terms of the phasor diagram for real power control given in FIG. 5, the effect of using multiplier 30 is to vary the amplitude of the input summation signal according to the magnitude of $v_{s2}$. As the final step, the signal $-E_b$ produced by sign inverter 32 is combined with the variable amplitude summation signal representative of $-E_z$ using a second operational amplifier summer 33. The output is the desired phase and amplitude shifted cycloconverter reference voltage $E_{s-ref}$. It is obvious that the input power factor and real power can be electronically adjusted independently of one another, and that either may be held constant while varying the other.

Figure 10:
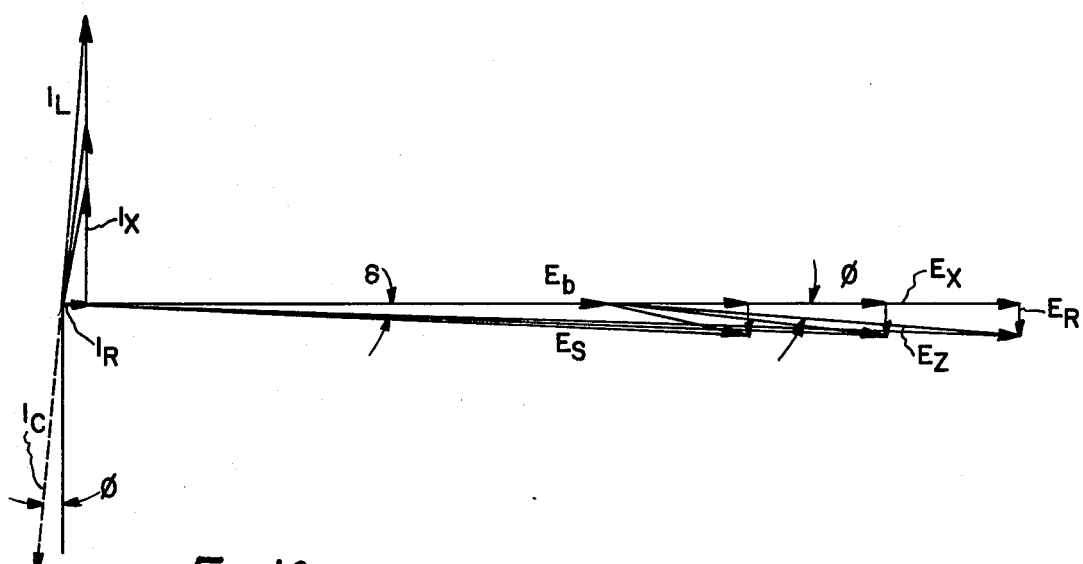
FIG. 10 is a phasor diagram useful in explaining operation of the static controller for power factor correction and adaptive filtering.

With the foregoing discussion of FIGS. 4–9 as background, the theoretical basis for operating the static controller to generate leading reactive power for power factor correction can be explained. In FIG. 10, the phasor $\overline{E}_R$ is constructed in the fourth quadrant and the angle δ is relatively small and less than zero for source to cycloconverter power flow. For the three cases illustrated, $\overline{E}_R$ remains constant as $\overline{E}_x$ is modulated with a consequent change in the induced voltage $E_s$. Although there is a change in the power factor angle φ, the change is relatively small and the predominant change is in $\overline{E}_x$. The line current $I_L$ is constructed in the first quadrant and leads the distribution system line voltage $E_b$ by nearly 90°. In similar fashion, $I_R$ and φ show no or little change and the predominant change is in $\overline{I}_x$, which leads $E_b$ by exactly 90°. When $\overline{E}_x$ is reversed in direction and modulated, the phasor $\overline{I}_x$ is reversed in direction and constructed in the fourth quadrant and the line current $I_L$ then lags the line voltage $E_b$ by 90°. These form the basis for leading and lagging reactive power control in the voltage control system, assuming that only sufficient real power is supplied to the resonant tank to compensate for the inherent circuit losses.

Figure 11:
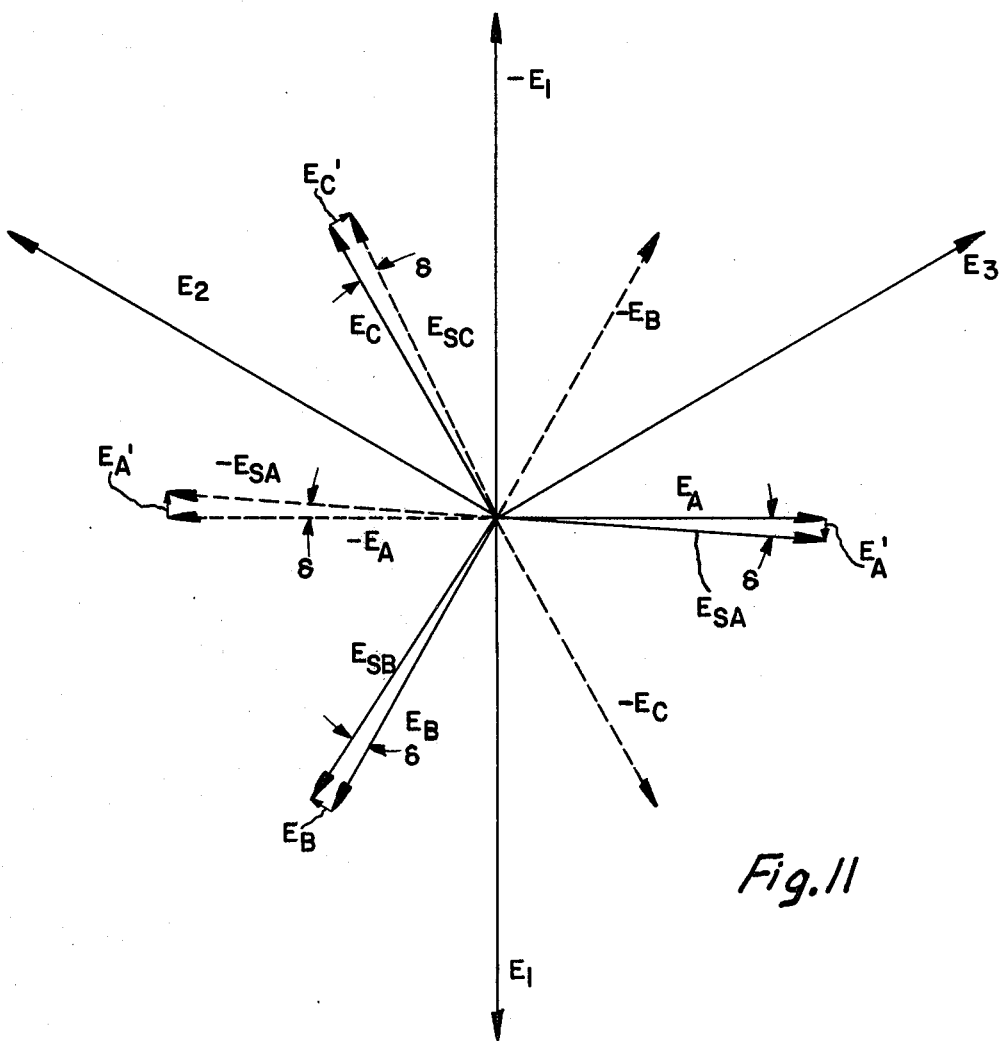
FIG. 11 is a phasor diagram useful in explaining operation of the different form of phase and amplitude shifter shown in FIGS. 2 and 3.

FIG. 2 shows the complete phase and amplitude shifter circuit 26' for a balanced system with provision for real power control and input power factor (reactive power) control in either the leading or lagging direction. Phase shifter 26' is a modification of phase shifter 26 shown in FIG. 9, which can also be used in the practice of the invention when there is an unbalanced system. As a special case when the three phase power supply is balanced in amplitude and phase, the cosine wave or frequency insensitive $E_b < 90°$ phasor can be generated conveniently by the addition and subtraction of the phase voltages. FIG. 11 gives the phasor diagram used to explain the basis of operation of the phase shifter circuit in FIG. 2 (also see FIG. 3). To obtain the frequency insensitive cosine wave for each phase, as well as each single phase line voltage three step-down transformers 35a, 35b and 35c have their primary windings respectively connected between each input line and neutral. Each single phase transformer has a split secondary winding such that one gives the positive polarity phase voltage while the other gives the negative polarity phase voltage, e.g., $E_C$ and $-E_C$. The circuit for producing the phase A cycloconverter reference signal $E_{sA}$ will be explained by way of illustration, the other two phases being similar so that corresponding components in the three phases are indicated by corresponding numerals. To obtain the frequency insensitive 90° phase shifted cosine wave (in FIG. 11, see the phasor $-\overline{E}_1$ which is perpendicular to the reference line voltage phasor $\overline{E}_A$), the appropriate secondary windings of transformers 35b and 35c are connected to obtain a voltage signal representing $E_C-E_B$ which by phasor addition gives $-E_1$. To this end, as is illustrated, the dot end of the appropriate secondary winding of transformer 35b is grounded while the other end is connected to the undotted end of the appropriate secondary winding in transformer 35c. The dot or positive polarity end of this latter secondary winding is coupled directly to a potentiometer 36c for deriving at the wiper a proportional voltage to be supplied as one input to the analog four-quadrant multiplier 37a. The positive or negative polarity real power control signal $v_{s2}$ is the high frequency tank voltage error signal representing the difference between actual and desired values of tank voltage, and is the second input to multiplier 37a so as to generate at its output a cosine wave with a modulated amplitude representing $-E_A'$. This cosine wave with a polarity and peak amplitude dependent upon the polarity and magnitude of the real power control signal is fed through an input resistor to the summing junction 38a of an operational amplifier 39a connected as a summing amplifier. To obtain input power factor (reactive power) control, the negative-going sine wave line voltage $-E_A$ is an input to a second two-quadrant multiplier 40a used as a variable gain amplifier, the other input to multiplier 40a being the power factor correction or VAR control signal $v_{s1}$. For a gain = 1, PF = 1; while for a gain greater than 1 the PF is leading; and for a gain between 0 and 1 the PF is lagging. Since the angle δ is small, using multiplier 40a to modulate the magnitude of the $-\overline{E}_A$ phasor effectively produces a like change in $-\overline{E}_{sA}$ and thus also in the quadrature component of line current $I_x$. The variable amplitude sine wave at the output of multiplier 40a is the other input to summing junction 38a. Due to the inverting characteristic of summing amplifier 39a, the cycloconverter reference signal generated at its output is the desired positive polarity signal $E_{sA}$. The respectively 120° displaced cycloconverter reference signals $E_{sB}$ and $E_{sC}$ are obtained at the outputs of the other channels. For further information on the amplitude and phase shifter, the reader may refer to the copending Bose and Espelage application Ser. No. 562,338 filed on Mar. 25, 1975, entitled "Phase Shifter for Controlling the Power Components and Power Factor of a Cycloconverter," assigned to the same assignee. In this application FIG. 8 shows a device for independent real and reactive power control which may have utility in this invention.

A tank voltage feedback circuit is used for generating the tank voltage error signal indicative of the difference between a sensed instantaneous tank voltage and a reference tank voltage. A suitable voltage sensor is used to sense the high frequency tank voltage, such as the potential transformer 42 shown in FIG. 2 coupled across the resonant tank components 17 and 18 and having a grounded center tap secondary winding the opposite ends of which are connected to alternately conductive diodes 43 to produce a full wave rectified ac voltage. A corresponding dc voltage or sensor signal is generated as by using a resistor-capacitor peak detector 44, and is fed through an input resistor to the summing junction 45 of an operational amplifier 46 connected as a summing amplifier. The other input to the summing junction 45 is a preselected dc reference tank voltage $V_{T-ref}$. A tank voltage error signal generated at the output of operational amplifier 46 is used directly as the real power control signal $v_{s2}$ and is either positive or negative depending upon the magnitude of the sensed actual tank voltage as compared to the reference tank voltage. Thus, the direction of power flow through the cycloconverter 15 changes depending upon the polarity of the tank voltage error signal, although usually power flow is in the direction from the source to the cycloconverter. As was mentioned, the cycloconverter firing and control circuitry 47 actuated by the three per phase cycloconverter reference signals is of conventional design and is illustrated in somewhat more detail in FIG. 3.

Figure 3:
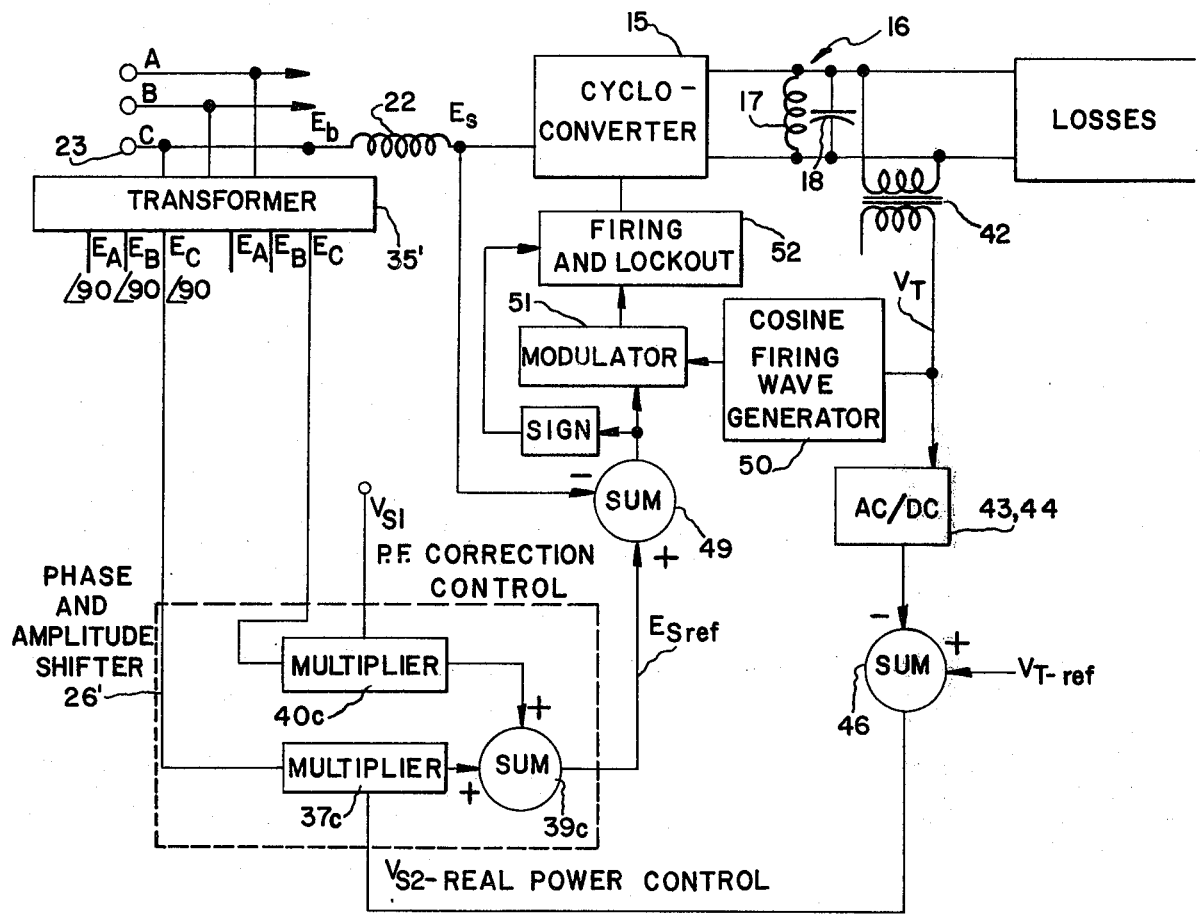
FIG. 3 is a system block diagram showing only a single phase of the control circuit in greater detail than in FIG. 2.

In FIG. 3, the input filter is shown schematically and partially omitted, the high frequency resonant tank 16 is shown in its simplest form, and the static controller losses are illustrated as an equivalent load. Only a single phase of the phase and amplitude shifter 26' is illustrated schematically, as is the three-phase transformer 35' for generating the input sine wave line voltage signals and the 90° phase shifted cosine wave signals. The main components of the tank voltage control loop for generating the real power control signal are designated by the same numerals. To further explain the cycloconverter firing and control circuitry, the appropriately phase and amplitude shifted cycloconverter control signal $E_{s-ref}$, which commands the induced voltage $E_s$ to be produced, is compared with a per phase sensed induced voltage $E_s$ using a summer 49 to derive an error voltage for driving the cycloconverter firing circuits. In order to use the cosine firing wave phase control method of control, the instantaneous tank voltage signal $V_T$ derived from the potential transformer 42 or a similar transformer is fed to a frequency insensitive cosine firing wave generator 50 preferably of the type described in the previously mentioned application, Ser. No. 561,592. In the modulator 51, as is known in the art, the successive intersections of the induced voltage error signal with the high frequency cosine firing waves are continuously determined to time the generation of SCR firing pulses by the firing and lock-out circuitry 52. Depending upon the commanded direction of power flow through the cycloconverter, one SCR in each inverse-parallel pair is locked out according to the sign of the induced voltage error signal. For further information on thyristor firing control using the cosine firing wave technique, the reader is referred to the book, "The Theory and Design of Cycloconverters" by William McMurray, The MIT Press, Cambridge, Mass., copyright 1972, Library of Congress catalog card No. 70-178121.

With reference to the voltage control system described herein for controlling the cycloconverter, reference may be made to the concurrently filed allowed Bose and Espelage application, Ser. No. 573,373 entitled "Voltage Control System for High Frequency Link Cycloconverter," assigned to the same assignee. By way of summary, this technique controls the induced cycloconverter voltage $E_s$ to be approximately in phase with the distribution system line voltage $E_b$, as a result of which the line current is approximately 90° leading or lagging with respect to the line voltage. The magnitude and sign of the line current depends upon the magnitude and sign of the voltage difference between $E_b$ and $E_s$. In general, the magnitude of the line current and of the reactive power produced by the static controller is approximately proportional to the difference $E_b$-$E_s$. Instead of using a voltage control scheme for the static controller a current control scheme can be used to directly construct the line current 90° displaced either leading or lagging with respect to the distribution system line voltage. This is further described in application Ser. No. 600,879 filed on July 31, 1975 by the inventor, assigned to the same assignee as this invention.

While the invention has been particularly shown and described with reference to a preferred embodiment thereof, it will be understood by those skilled in the art that changes in form and details may be made therein without departing from the spirit and scope of the invention.

The invention claimed is:

1. A static reactive power controller comprising
    a polyphase cycloconverter circuit connected in cascade with a high frequency resonant tank circuit effectively comprised by an inductor and capacitor in parallel, said cycloconverter circuit having in each phase an input filter including a series filter inductor connectable to a source of low frequency line voltage, and
    control means for controlling said cycloconverter to produce real power flow to said resonant tank only approximately sufficient to supply the static controller losses while selectively producing a variable amount of leading and lagging reactive power as determined by the polarity and magnitude of a system control signal representative of a system quantity to be controlled.

2. A static controller according to claim 1 wherein said control means includes tank voltage feedback circuit means for generating a tank voltage error signal indicative of the difference between a sensed instantaneous tank voltage and a reference tank voltage, and means for using said tank voltage error signal to control the real power flow of said cycloconverter.

3. A static controller according to claim 1 wherein said control means is comprised by
    phase and amplitude shifter means for generating per phase cycloconverter reference signals for effectively determining the real power and reactive power of the cycloconverter respectively in dependence upon the polarity and magnitude of a tank voltage error signal and the polarity and magnitude of said system control signal,
    tank voltage feedback circuit means including sensor means for sensing the instantaneous tank voltage and deriving a sensor signal indicative thereof, and means for comparing said tank voltage sensor signal to a reference and generating said tank voltage error signal, and
    firing and control means actuated by said cycloconverter reference signals for controlling said cycloconverter to selectively produce leading and lagging reactive power as determined by said system control signal.

4. A static reactive power controller comprising
    a polyphase cycloconverter circuit connected in cascade with a single phase high frequency resonant tank circuit comprised by an inductor and a capacitor in parallel, said cycloconverter circuit having in each phase input filter means including a series filter inductor connectable to a source of low frequency distribution system voltage, and
    control means for controlling said cycloconverter to produce real power flow to said resonant tank only approximately sufficient to supply the static controller losses in dependence upon the magnitude and polarity of a real power control signal, said control means further controlling said cycloconverter to produce a variable amount of capacitive reactive power as determined by the magnitude of a system control signal representative of a distribution system quantity to be controlled.

5. A static controller according to claim 4 wherein said control means includes tank voltage feedback circuit means for generating a tank voltage error signal indicative of the difference between a sensed instantaneous tank voltage and a reference tank voltage, said tank voltage error signal being used as the real power control signal.

6. A static controller according to claim 5 wherein said control means further includes
    phase and amplitude shifter means for generating per phase cycloconverter reference signals that are phase and amplitude shifted with respect to a selected line parameter to effectively determine the real power and reactive power of the cycloconverter respectively in dependence upon the polarity and magnitude of said tank voltage error signal and the magnitude of said system control signal, and
    firing and control means actuated by said cycloconverter reference signals for controlling said cycloconverter.

7. A static controller for power factor correction comprising
    a polyphase cycloconverter circuit including a plurality of single phase-to-single phase cycloconverters each connected in cascade with a single phase high frequency resonant tank circuit comprised by an inductor and capacitor in parallel, said polyphase cycloconverter circuit having input filter means including in each phase a filter inductor in series with the respective single phase-to-single phase cycloconverter and connectable to a source of low frequency distribution system line voltage, and
    control means for controlling said cycloconverter to produce real power flow to said resonant tank only approximately sufficient to supply the static controller losses while selectively producing a variable amount of leading and lagging reactive power as determined by the polarity and magnitude of a distribution system power factor correction control signal.

8. A static controller according to claim 7 wherein said control means includes tank voltage feedback circuit means for generating a tank voltage error signal indicative of the difference between a sensed instantaneous tank voltage and a reference tank voltage, and means for using said tank voltage error signal to determine the real power flow of the cycloconverter.

9. A static controller according to claim 7 wherein said control means is comprised by phase and amplitude shifter means for generating per phase cycloconverter reference signals that are phase and amplitude shifted with respect to a selected line parameter to effectively determine the real power and reactive power of the cycloconverter respectively in dependence upon the polarity and magnitude of a tank voltage error signal and the polarity and magnitude of said power factor correction control signal, tank voltage feedback circuit means for deriving an instantaneous tank voltage sensor signal and summing said sensor signal with a reference tank voltage to generate said tank voltage error signal, and firing and control means actuated by said cycloconverter reference signals for controlling the polyphase cycloconverter to selectively produce leading and lagging reactive power as determined by said power factor correction control signal.

10. A static controller according to claim 9 wherein said phase and amplitude shifter means is comprised in each phase by means for converting at least two input sine wave signals representative of the per phase line voltages to a cosine wave signal of proportional amplitude, first multiplier means for varying the amplitude and polarity of said cosine wave signal in dependence upon the magnitude and polarity of said tank voltage error signal to thereby generate a variable amplitude cosine wave signal, second multiplier means for varying the amplitude of another per phase sine wave line voltage signal in dependence upon the magnitude and polarity of said power factor correction control signal to thereby generate a variable amplitude sine wave signal, and summing means for summing said variable amplitude sine wave and cosine wave signals to generate said per phase cycloconverter reference signal.

11. A static controller according to claim 10 wherein said firing and control means is actuated in each phase by the error between an instantaneous sensed valve of the selected line parameter and the respective cycloconverter reference signal.

* * * * *